(12) United States Patent
Wan

(10) Patent No.: US 9,842,069 B2
(45) Date of Patent: Dec. 12, 2017

(54) HARDWARE ACCELERATOR AND CHIP

(71) Applicant: Huawei Technologies Co., Ltd., Shenzhen (CN)

(72) Inventor: Yupeng Wan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 14/981,523

(22) Filed: Dec. 28, 2015

(65) Prior Publication Data

US 2016/0196221 A1   Jul. 7, 2016

(30) Foreign Application Priority Data

Jan. 4, 2015 (CN) .......................... 2015 1 0003918

(51) Int. Cl.
 *G06F 13/16* (2006.01)
 *G06F 13/42* (2006.01)
(52) U.S. Cl.
 CPC ...... *G06F 13/1642* (2013.01); *G06F 13/1673* (2013.01); *G06F 13/4282* (2013.01)
(58) Field of Classification Search
 CPC ............. G06F 13/1642; G06F 13/1673; G06F 13/4282
 See application file for complete search history.

(56) References Cited

U.S. PATENT DOCUMENTS

| 9,292,346 | B1* | 3/2016 | Holt | .................... G06F 9/4881 |
| 9,424,315 | B2* | 8/2016 | Chamdani | ............. G06F 9/4881 |
| 2004/0172234 | A1 | 9/2004 | Dapp et al. | |
| 2009/0158282 | A1 | 6/2009 | Blaisdell et al. | |
| 2012/0084543 | A1 | 4/2012 | Pross et al. | |
| 2016/0210167 | A1* | 7/2016 | Bolic | ................. G06F 9/45558 |

FOREIGN PATENT DOCUMENTS

| CN | 1781078 A | 5/2006 |
| CN | 101052958 A | 10/2007 |
| CN | 102446085 A | 5/2012 |
| CN | 103777918 A | 5/2014 |
| JP | 2611087 B2 | 5/1997 |

\* cited by examiner

*Primary Examiner* — Eric Oberly
(74) *Attorney, Agent, or Firm* — Leydig, Voit & Mayer, Ltd.

(57) ABSTRACT

Present invention disclose a hardware accelerator and a chip, and the hardware accelerator includes: an interface circuit and an accelerator core coupled to the interface circuit, where the interface circuit is configured to receive a first task request, perform decoding on the first task request to acquire identifier information, and configure, according to the identifier information, the first task request to be in an FIFO queue that matches the identifier information; a scheduling controller is configured to determine, from at least two channel groups, one or more target channel groups that have at least one to-be-processed second task request in an $n^{th}$ period, receive a time parameter that is fed back by the accelerator core and corresponding to the target channel group, and schedule the at least one second task request in the one or more target channel groups according to the time parameter and a weighted round robin algorithm.

19 Claims, 6 Drawing Sheets

US 9,842,069 B2

HARDWARE ACCELERATOR AND CHIP

CROSS-REFERENCE TO RELATED APPLICATION

This application claims priority to Chinese Patent Application No. 201510003918.6, filed on Jan. 4, 2015, which is hereby incorporated by reference in its entirety.

TECHNICAL FIELD

The present invention relates to the communications field, and in particular, to a hardware accelerator and a chip.

BACKGROUND

Currently, people have developed various types of hardware accelerators to accelerate execution of some functions in a computer system. For example, a principle of a graphics accelerator is migrating all or some graphics functions from a processor to a dedicated hardware accelerator. Compared with the processor, the dedicated hardware accelerator can execute these graphics functions within shorter time. In addition, there are other types of hardware accelerators, such as an accelerator for processing an Extensible Markup Language, an accelerator for executing compression and decompression, a floating-point processor for executing a floating-point operation, and an accelerator for executing encryption and decryption. In general, any hardware that can execute a function allocated by a processor can be considered as a hardware accelerator.

In a wireless communications technology, to alleviate pressure of a baseband processor in a baseband chip, a baseband chip in an existing base station generally uses an algorithm accelerator to execute partial algorithm functions. With development of wireless communications technologies, an increasing number of baseband chips need to simultaneously support multiple communications standards, which include but are not limited to standards such as a Global System for Mobile Communications (Global System for Mobile Communications, GSM), a Universal Mobile Telecommunications System (Universal Mobile Telecommunications System, UMTS), time division duplex-Long Term Evolution (TDD-LTE), and frequency division duplex-Long Term Evolution (FDD-LTE). To simultaneously support algorithm processing of multiple communications standards, the algorithm accelerator in the existing baseband chip commonly uses a common-mode accelerator, for example, a common-mode accelerator simultaneously supporting the UMTS standard and the LTE standard, and a common-mode accelerator simultaneously supporting the GSM standard and the LTE standard. In addition, even if the algorithm accelerator supports only the LTE standard, the algorithm accelerator generally supports not only algorithm processing of the TDD-LTE standard and but also algorithm processing of the FDD-LTE standard. From a perspective of function implementation, an algorithm accelerator supporting the LTE standard is also a common-mode accelerator.

In the prior art, as shown in FIG. 1, a baseband chip including a common-mode accelerator is already developed, and may also be referred to as a multimode baseband system on chip (system on chip, SOC), where a single baseband chip supports only a single standard, for example, supports only the UMTS standard or supports only the LTE standard. However, such a baseband chip that includes a common-mode accelerator does not support chip-level multimode concurrence. For a multimode concurrence scenario, a solution of a combination of multiple baseband chips needs to be used to implement multimode concurrence at a board (also referred to as a printed circuit board) level. This solution not only wastes a processing capability of a multimode accelerator in each baseband chip, but also increases costs of base station boards due to use of multiple baseband chips.

Further, as shown in FIG. 2, the prior art provides another SOC chip supporting multimode concurrence, where single-mode/multimode algorithm accelerators are coupled to a baseband processor by using respective accelerator interfaces and buses. Processor cores of the baseband processor are separately responsible for different communications standards. Each communications standard is corresponding to a single-mode accelerator, for example, a GSM algorithm accelerator, a UMTS algorithm accelerator, or a TDD/FDD LTE algorithm accelerator. A common-mode accelerator, for example, a UL common-mode algorithm accelerator core, can be used by multiple processor cores at the same time. However, in different scenarios, to ensure that the common-mode accelerator maintains an expected processing capability for task requests of different communications standards, the processor cores need to communicate with each other to balance utilization of the processing capability of the common-mode accelerator among the different communications standards. In this case, if a processor core that is responsible for different communications standards accesses register space of a common-mode accelerator, it needs to be ensured that communications standards do not affect each other; otherwise, once an access error occurs, a register parameter of another communications standard is modified, that is, an error of one communications standard affects work of another communications standard. In addition, it also needs to be ensured that data, a message, an interrupt, and the like output when the common-mode accelerator processes a task of one communications standard do not occupy a resource of another communications standard, for example, data space, a sequence number of an interrupt; otherwise, an error of the another communications standard is caused. It can be seen that a process of communication between the processor cores is considerably complicated and prone to an error.

SUMMARY

Embodiments of the present invention provide a hardware accelerator and a chip. Load balance among multiple communications standards is implemented by using an interface circuit of the hardware accelerator, without relying on complex communication between processor cores to implement load balance.

According to a first aspect, the present invention provides a hardware accelerator, including: an interface circuit and an accelerator core coupled to the interface circuit, where the interface circuit includes: an input/output (I/O) interface, a queue manager, and a scheduling controller; where the I/O interface is configured to receive a first task request, where the first task request carries identifier information used to indicate a communications standard to which the first task request belongs, and a priority of the first task request; the queue manager includes: a decoding circuit and at least two channel groups, where the at least two channel groups are respectively corresponding to at least two preset communications standards, each channel group is corresponding to one communications standard, any one of the channel groups includes at least one first in first out (FIFO) queue, and the at least one FIFO queue is respectively corresponding to at least one preset priority, and the decoding circuit is configured to perform decoding on the first task request to acquire the identifier information, and configure, according to the identifier information, the first task request to be in a FIFO queue that matches the identifier information; the scheduling controller is configured to determine, from the at least two channel groups, one or more target channel groups that have at least one to-be-processed second task request in an $n^{th}$ period, receive a time parameter that is fed back by the accelerator core and corresponding to the target channel group, and schedule the at least one second task request in the one or more target channel groups according to the time parameter and a weighted round robin algorithm, where the $n^{th}$ period is any period in which the scheduling controller performs periodic scheduling on a task request in the at least two channel groups, and n is a natural number; and the accelerator core is configured to respond to the at least one scheduled second task request.

In a first possible implementation manner of the first aspect, when the identifier information includes a first virtual machine identifier VMID and a priority identifier PID, where the first VMID indicates the communications standard to which the first task request belongs and the PID indicates the priority of the first task request, the decoding circuit is specifically configured to: query a preset first address table according to the first VMID and the PID to determine a FIFO queue that matches the first VMID and the PID, and configure the first task request to be in the matched FIFO queue, where the first address table includes a correspondence between each FIFO queue in the at least two channel groups, a preset VMID, and a preset PID.

In a second possible implementation manner of the first aspect, when the identifier information includes a VMID and an attribute identifier and the at least one FIFO queue is further respectively corresponding to a preset attribute identifier, where the VMID indicates the communications standard to which the first task request belongs and the attribute identifier indicates an attribute of the first task request, the decoding circuit is specifically configured to: query a preset second address table according to the VMID and the attribute identifier to determine a FIFO queue that matches the VMID and the attribute identifier, and configure the first task request to be in the FIFO queue that matches the VMID and the attribute identifier, where the second address table includes a correspondence between each FIFO queue in the at least two channel groups, a preset VMID, and a preset attribute identifier.

With reference to the first aspect or the first possible implementation manner of the first aspect or the second possible implementation manner of the first aspect, in a third possible implementation manner, the scheduling controller includes: a control unit, a scheduling unit and a selecting unit, where: the selecting unit is configured to perform polling on the at least two channel groups to determine the one or more target channel groups from the at least two channel groups; the control unit is configured to receive the time parameter delay$_i$ that is fed back by the accelerator core and corresponding to the target channel group, and calculate respective weight values of the target channel groups according to the following formula:

$W_i$=Duration$_i$=Duration$_{i'}$+delay$_i$/Rate$_i$, where $W_i$ is a weight value of any channel group i of the target channel groups, Duration$_i$ is accumulated processing time of task requests in the channel group i in the $n^{th}$ period, Duration$_{i'}$ is accumulated processing time of the task requests in the channel group i in an $(n-1)^{th}$ period, delay$_i$ is processing time, in the accelerator core, of each task request in the channel group i in the $(n-1)^{th}$ period, Rate$_i$ is a ratio of a processing capability allocated to the channel group i to a processing capability allocated in advance by the accelerator core to the at least two channel groups, and i is a positive integer; and the scheduling unit is configured to read the at least one second task request to be processed in the one or more target channel groups in the $n^{th}$ period, perform, based on the respective weight values of the target channel groups, weighted round robin scheduling on the at least one second task request, and send the at least one scheduled second task request to the accelerator core.

With reference to the third possible implementation manner of the first aspect, in a fourth possible implementation manner, the selecting unit is specifically configured to perform polling on all FIFO queues in the at least two channel groups, or configured to concurrently perform polling on each channel group of the at least two channel groups to determine the one or more target channel groups from the at least two channel groups.

With reference to the third possible implementation manner of the first aspect or the fourth possible implementation manner of the first aspect, in a fifth possible implementation manner, when performing the weighted round robin scheduling on the at least one second task request, the scheduling unit performs the scheduling in ascending order of the respective weight values of the target channel groups.

With reference to the third possible implementation manner of the first aspect or the fourth possible implementation manner of the first aspect or the fifth possible implementation manner of the first aspect, in a sixth possible implementation manner, the scheduling unit specifically includes: a multiplexer switch and a scheduling circuit, where: the multiplexer switch is configured to separately convert the respective weight values of the target channel groups into control signals, sequentially select, in ascending order of the respective weight values of the target channel groups, a second task request in each target channel group and then send the second task request to the scheduling circuit; and the scheduling circuit is configured to separately schedule the second task request in each target channel group to the accelerator in a priority-based and/or round robin scheduling manner.

With reference to any possible implementation manner of the first possible implementation manner to the sixth possible implementation manner of the first aspect, in a seventh possible implementation manner, the accelerator core is further configured to count a time parameter of each task request in the $n^{th}$ period and provide a feedback to the scheduling controller in an $(n+1)^{th}$ period, so that the scheduling controller performs next scheduling.

With reference to any possible implementation manner of the first possible implementation manner to the seventh possible implementation manner of the first aspect, in an eighth possible implementation manner, the interface circuit further includes an interruption controller and an interruption interface, where the interruption controller includes at least two interruption units, the at least two interruption units are corresponding, in a one-to-one manner, to the at least two communications standards, and any interruption unit of the at least two interruption units is configured to: receive interruption information sent by the accelerator core, and acquire, by querying a preset interruption information table, a VMID corresponding to the interruption information; and if the VMID corresponding to the interruption information is equal to a preset VMID of a channel group corresponding to the any interruption unit, send the interruption information by using the interruption interface; or if the VMID corresponding to the interruption information is not equal to a preset VMID of a channel group corresponding to the any interruption unit, prohibit sending the interruption information; where the interruption information table includes a correspondence between interruption information and a VMID, and the interruption information is used to instruct a processor core of a communications standard corresponding to the any interruption unit to interrupt communication with the accelerator core.

According to a second aspect, the present invention provides a chip, including: at least two processor cores, a bus, and the hardware accelerator according to the first aspect and any implementation manner of the first possible implementation manner to the eighth possible implementation manner of the first aspect, where the hardware accelerator communicates with the at least two processor cores by using the bus, and the at least two processor cores are respectively corresponding, in a one-to-one manner, to the at least two communications standards and configured to generate first task requests of different communications standards; and any processor core of the at least two processor cores is configured to send the first task request to the hardware accelerator, so that the hardware accelerator responds to the first task request.

In a first possible implementation manner of the second aspect, the chip further includes: a configuration manager, where the configuration manager is configured to configure identifier information for the first task requests from the at least two processor cores, so that the hardware accelerator schedules the first task requests according to the identifier information.

According to the hardware accelerator and the chip that are provided in the present invention, a configuration process is effectively isolated, and mutual impact between multiple communications standards is avoided. Further, task requests in multiple channel groups are scheduled based on weight values of the channel groups, so that the hardware accelerator maintains an expected processing capability for task requests of different communications standards, thereby implementing load balance.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
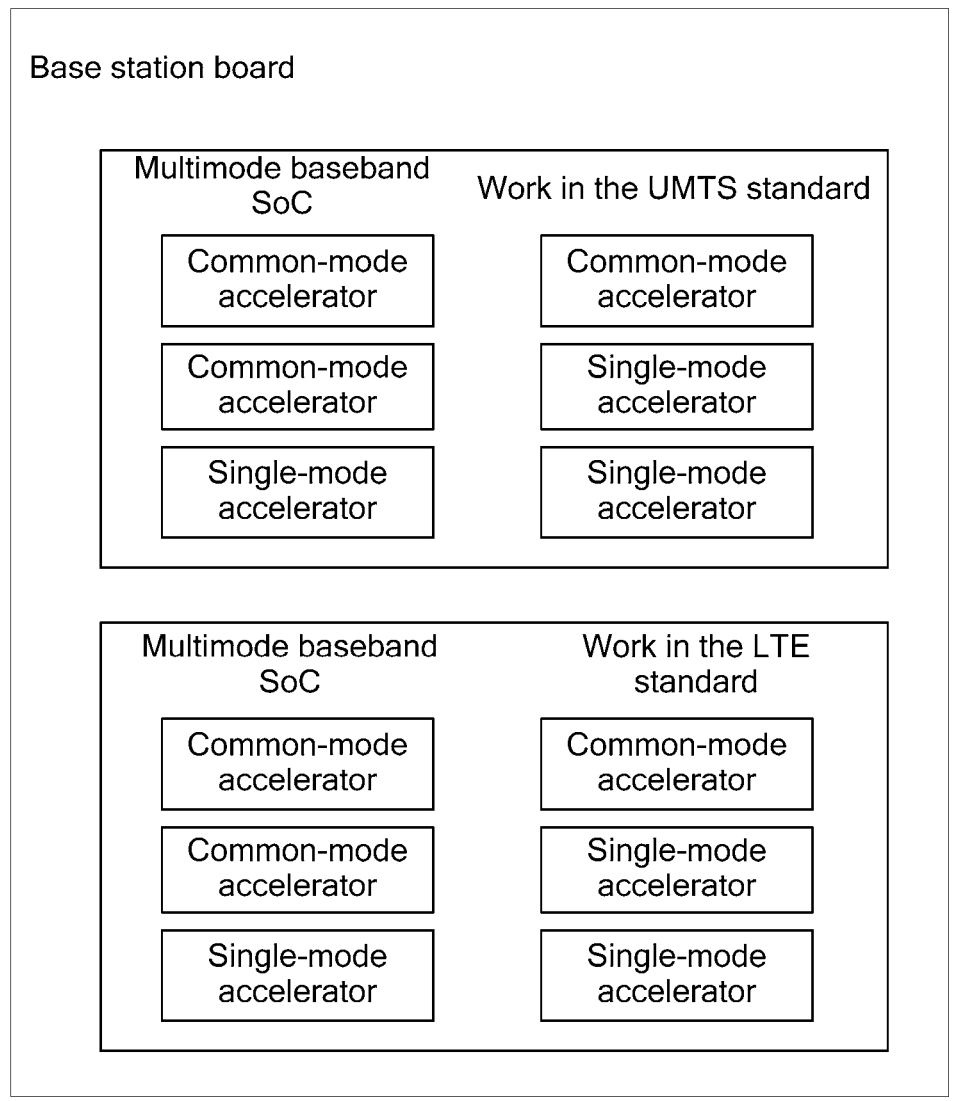
FIG. 1 is an architecture diagram of a base station board that uses a common-mode accelerator in the prior art.
Figure 2:
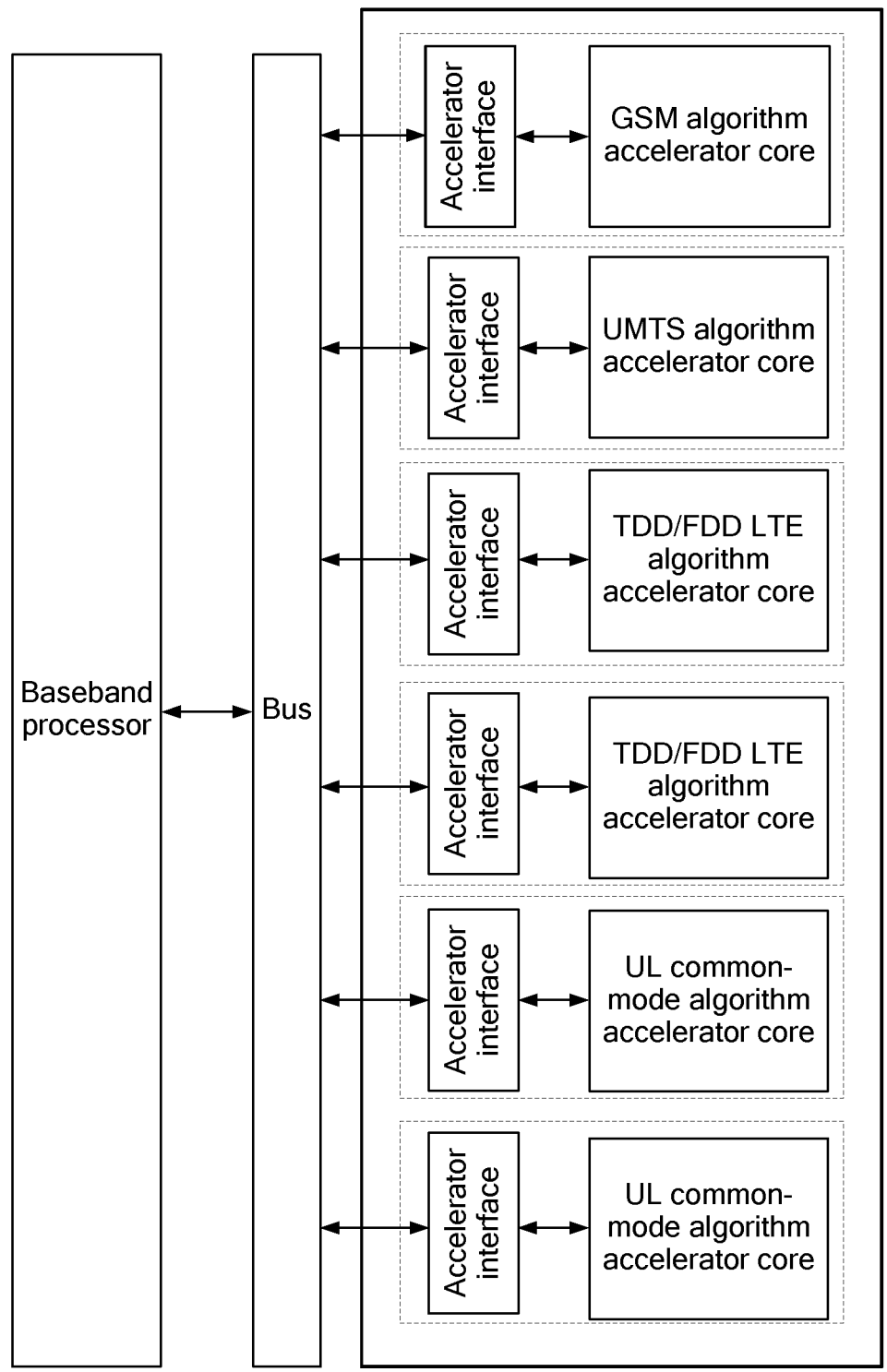
FIG. 2 is an architecture diagram of another system-on-chip that uses a common-mode accelerator in the prior art.
Figure 3:
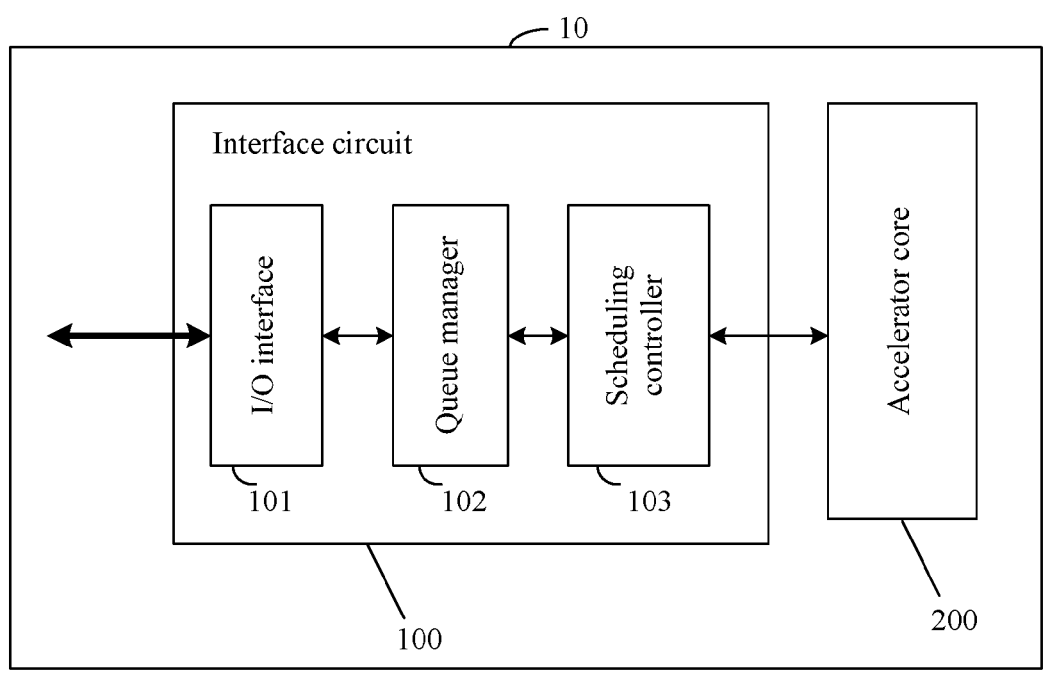
FIG. 3 is an architecture diagram of a hardware accelerator according to Embodiment 1 of the present invention.
Figure 4:
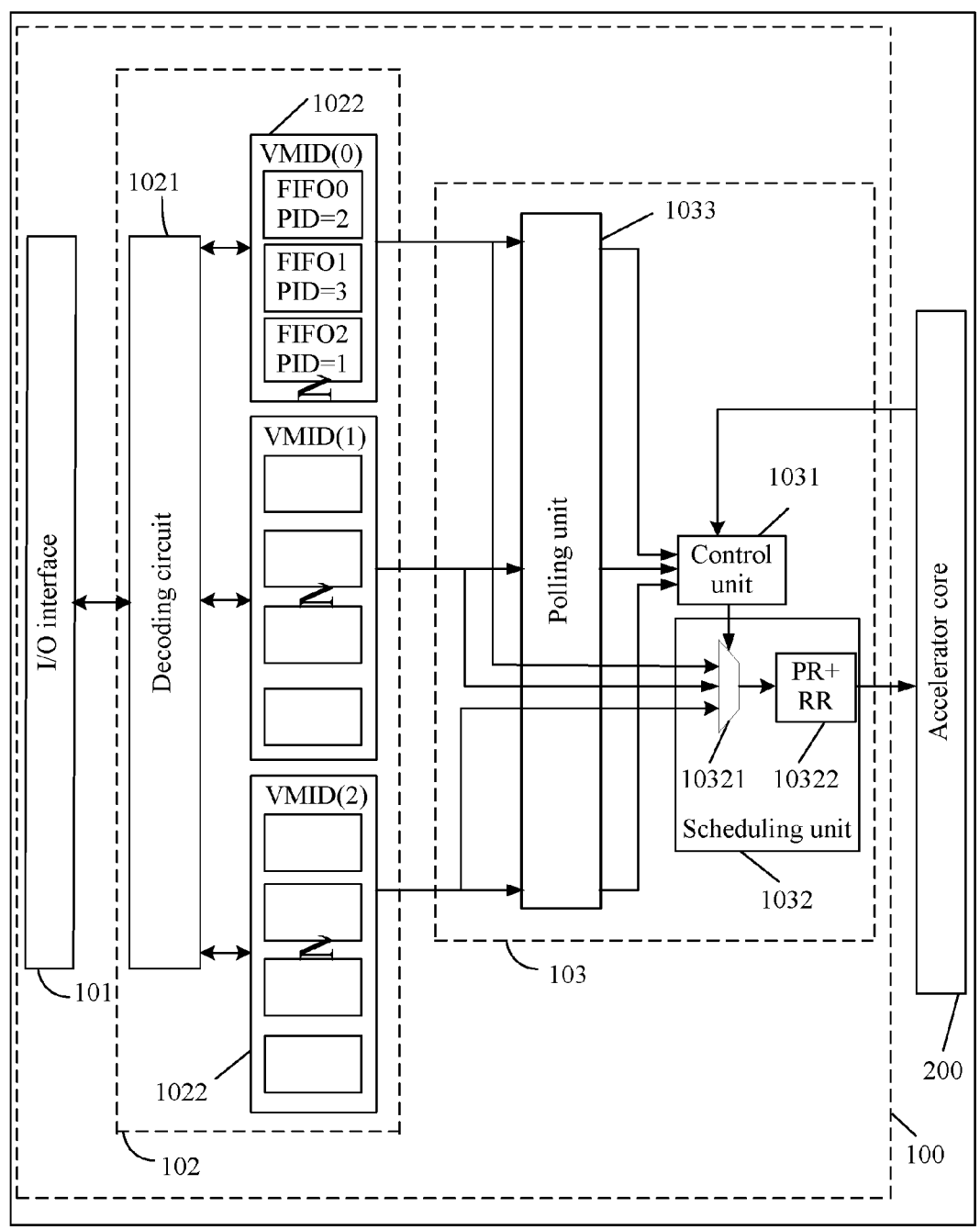
FIG. 4 is a schematic diagram of a structure of a hardware accelerator according to Embodiment 1 of the present invention.

As shown in FIG. 3 and FIG. 4, Embodiment 1 of the present invention provides a hardware accelerator 10, including: an interface circuit 100 and an accelerator core 200 coupled to the interface circuit 100.

The interface circuit 100 includes: an input/output (I/O) interface 101, a queue manager 102, and a scheduling controller 103.

The I/O interface 101 is configured to receive a first task request, where the first task request carries identifier information, and the identifier information is used to indicate a communications standard to which the first task request belongs, and a priority of the first task request. It should be known that for a hardware accelerator that supports multi-mode concurrence, for example, for a hardware accelerator that supports three communications standards, that is, LTE, GSM, and UMTS, a first task request received by the hardware accelerator may be a task request of the LTE standard, or may be a task request of the GSM standard; task requests of a same communications standard may be classified into task requests of multiple priorities according to attributes of the task requests.

The queue manager 102 includes a decoding circuit 1021 and at least two channel groups 1022, where the at least two channel groups 1022 are respectively corresponding to at least two preset communications standards, each channel group is corresponding to one communications standard, any one of the channel groups includes at least one first in first out (first in first out, FIFO) queue, and the at least one FIFO queue is respectively corresponding to at least one preset priority; and the decoding circuit 1021 is configured to perform decoding on the first task request to acquire the identifier information, and configure, according to the identifier information, the first task request to be in a FIFO queue corresponding to the identifier information. It should be noted that channel groups are respectively corresponding to different communications standards, and at least one FIFO queue in a same channel group may be corresponding to different priorities, or may be corresponding to a same priority because priorities of task requests of different types may be the same, or may be different, which, specifically, may be set according to an actual requirement. A quantity of FIFO queues may also be set according to an actual requirement, which is not limited herein. In addition, each FIFO queue may be a FIFO memory or may be partial storage space in a shared cache, and for details, reference may be made to the prior art.

The scheduling controller 103 is configured to determine, from the at least two channel groups 1022, a target channel group that has at least one to-be-processed second task request in an $n^{th}$ period, receive a time parameter that is fed back by the accelerator core 200 and corresponding to the target channel group, schedule the at least one second task request in the target channel group according to the time parameter and a weighted round robin (Weighted Round Robin, WRR) algorithm, and send the at least one scheduled second task request to the accelerator core 200, where the $n^{th}$ period is any period in which the scheduling controller 103 performs periodic scheduling on a task request in the at least two channel groups 1022, and n is a natural number.

Figure 5:
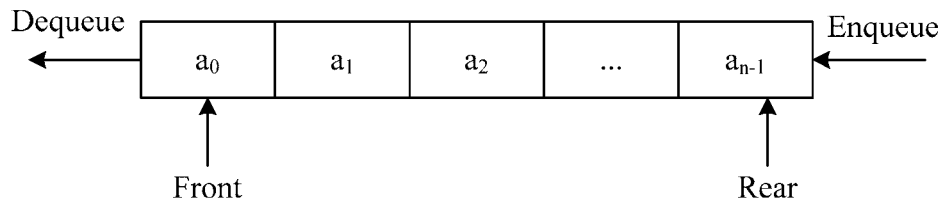
FIG. 5 is a schematic diagram of a FIFO queue according to Embodiment 1 of the present invention.

To better illustrate the technical solutions of the present invention, the following briefly describes a relationship between the FIFO queue, the first task request, and the second task request with reference to FIG. 5. As shown in FIG. 5, this embodiment provides a schematic diagram of a FIFO queue. It may be learned from FIG. 5 that the FIFO queue includes n elements, that is, $a_0, a_1, a_2, \ldots, a_{n-1}$. A person skilled in the art should know that the n elements may be n pieces of store space used to store a task request, where a front (Front) indicates an end at which deletion is allowed, and a rear (Rear) indicates an end at which insertion is allowed. Accordingly, the decoding circuit 1021 may configure the first task request to be in the element $a_{n-1}$ in the rear of the FIFO queue, and the scheduling controller 103 may acquire the second task request from the element $a_0$ in the front of the FIFO queue. When a FIFO queue is full in the $n^{th}$ period, it indicates that the FIFO queue has a task request that needs to be output. A channel group is a target channel group provided that at least one FIFO queue that is full in the $n^{th}$ period exists in the channel group. If none of FIFO queues in a channel group is full in the $n^{th}$ period, it indicates that the channel group is not a target channel group. For how to determine whether a FIFO queue is full or empty, many solutions are already proposed in the prior art. Reference may be made to the prior art, and details are not described herein.

When the scheduling controller 103 determines the target channel group from the at least two channel groups 1022, specifically, a manner such as performing polling on all FIFO queues in the at least two channel groups 1022 or concurrently performing query for the at least two channel groups 1022 may be used, which is not limited in this embodiment. In addition, each FIFO queue receives a first task request, after periodic scheduling, the first task request is output from the FIFO queue, that is, the second task request may be considered as the first task request output from any FIFO queue. In addition, the scheduling the at least one second task request is actually determining a time sequence for sending the at least one second task request to the accelerator core 200.

The accelerator core 200 is configured to respond to the at least one scheduled second task request. Further, the accelerator core 200 may further be configured to count a time parameter of each task request responded in the $n^{th}$ period, so that a feedback is provided to the scheduling controller 103 in an $(n+1)^{th}$ period for next scheduling. It should be known that the accelerator core 200 in this embodiment of the present invention can bear all or partial algorithm functions of a processor core in a baseband chip; therefore, the responding, by the accelerator core 200, to the at least one second task request is actually: taking the place of the processor core to perform a corresponding algorithm operation, and feeding back an operation result to the processor core. For details, reference may be made to the prior art, and details are not described herein.

In this embodiment, the interface circuit configures first task requests, which are to be sent by processor cores in the baseband chip to the accelerator core 200, to be in different channel groups, that is, to be in different FIFO memories. Therefore, when configuration for a FIFO memory is performed among multiple communications standards, a configuration process is effectively isolated, and mutual impact between the multiple communications standards is avoided. Further, task requests in multiple channel groups are scheduled based on weight values of the channel groups, which may implement isolation of a processing capability of the accelerator core 200 for task requests of different communications standards, so that the hardware accelerator maintains an expected processing capability for the task requests of the different communications standards, thereby implementing load balance.

In this embodiment, optionally, the identifier information includes: a first virtual machine identifier (Virtual Machine Identifier, VMID) and a priority identifier (Priority Identifier, PID), where the first VMID indicates the communications standard corresponding to the first task request and the PID indicates the priority of the first task request. The decoding circuit 1021 is specifically configured to: query a preset first address table according to the first VMID and the PID to determine a FIFO queue that matches the first VMID and the PID, and configure the first task request to be in the matched FIFO queue, where the first address table includes a correspondence between each FIFO queue in the at least two channel groups 1022, a preset VMID, and a preset PID. The following exemplarily describes the first address table by using Table 1.

TABLE 1

|       | VMID | PID |
|-------|------|-----|
| FIFO1 | 1    | 1   |
| FIFO2 | 1    | 2   |
| FIFO3 | 1    | 3   |
| FIFO4 | 2    | 1   |
| FIFO5 | 2    | 2   |
| FIFO6 | 2    | 3   |

In Table 1, it is assumed that a quantity of the at least two channel groups 1022 is two, where a VMID corresponding to a channel group 1 is 1, and a VIVID corresponding to a channel group 2 is 2; the channel group 1 includes three FIFO memories, that is, a FIFO 1, a FIFO 2 and a FIFO 3, the channel group 2 includes three FIFO memories, that is, a FIFO 4, a FIFO 5 and a FIFO 6, and the six FIFO memories are respectively corresponding to different priorities. If a VMID and a PID carried in the first task request are both 1, it may be learned, according to Table 1, that the first task request needs to be configured to be in the FIFO 1 in the channel group 1; if a VMID and a PID carried in the first task request are both 2, it may be learned, according to Table 1, that the first task request needs to be configured to be in the FIFO 5 in the channel group 2; and so on. Details are not described again.

It should be further noted that in the baseband chip, a dedicated processor may be used to allocate different VMIDs to task requests of different communications standards. Using FIG. 4 as an example, if the current hardware accelerator supports three communications standards, for example, three standards GSM, UMTS, and LTE, the baseband chip may allocate a VMID (0) to a task request of the GSM standard, allocate a VMID (1) to a task request of the UMTS standard, and allocate a VMID (2) to a task request of the LTE standard. It should be understood that, in an actual solution, each task request may include a VMID information field, and a number in parentheses represents a value allocated to the VMID information field. After receiving a task request, the hardware accelerator may parse a VMID information field of the task request to acquire a value of the VMID information field. When the value is 0, it may be determined that the task request is of the GSM standard. When the value is 1, it may be determined that the task request is of the UMTS standard. When the value is 2, it may be determined that the task request is of the LTE standard. Priorities of task requests of each communications standard may be distinguished by adding a PID information field to each task request and configuring different values.

In this embodiment, a quantity of the at least two channel groups 1022 may be the same as a quantity of communications standards supported by the hardware accelerator, and the at least two channel groups 1022 are respectively corresponding to different VMIDs. That is, channel groups of a same quantity may be preset according to the communications standards supported by the hardware accelerator. Herein the example in which the current hardware accelerator supports the three communications standards GSM, UMTS, and LTE is still used for description. Correspondingly, the at least two channel groups 1022 may specifically include three channel groups, where a channel group 1 is corresponding to a VMID (0), a channel group 2 is corresponding to a VMID (1), and a channel group 3 is corresponding to a VMID (2). Multiple FIFO queues may further be included in each channel group, and are corresponding to preset priorities, where a quantity of FIFO queues corresponding to a same priority may be one or more, which needs to be specifically determined by the baseband chip according to an attribute of a task request. When a channel group includes multiple FIFO queues of a same priority, the decoding circuit 1021 further needs to acquire a task attribute of each task request.

For example, as shown in FIG. 4, three FIFO queues are preset in a channel group 1, a PID corresponding to an FIFO queue 1 (that is, FIFO 0) is 2, a PID corresponding to an FIFO queue 2 (that is, FIFO 1) is 3, and a PID corresponding to an FIFO queue 3 (that is, FIFO 2) is 1. When the decoding circuit 1021 performs decoding on a first task request received by the I/O interface 101 and obtains a VMID and a PID of the first task request, the decoding circuit 1021 determines, according to the VMID of the first task request, whether the VMID matches any one of VMIDs (that is, VMID0, VMID1, and VMID2) corresponding to the three channel groups. If matched, the first task request is configured to be in an FIFO queue in a corresponding channel group. It is assumed herein that a value of the VMID and a value of the PID that are of the first task request are respectively 0 and 2; then, the first task request may be configured to be in the FIFO queue 1 (that is, FIFO 0) of the channel group 1. If not matched, a current operation is terminated. It should be noted that scheduling is strictly performed on task requests in FIFO queues in each channel group according to a priority. That is, at a same moment, task requests in a FIFO queue of a high priority are scheduled preferentially, task requests of a same priority are scheduled according to a preset polling sequence, and task requests in each FIFO queue are scheduled by following a first in first out rule. For details, reference may be made to the prior art, and details are not described herein.

In another implementation manner of this embodiment, optionally, the identifier information may specifically include: a virtual machine identifier VMID and an attribute identifier, where the VMID indicates the communications standard corresponding to the first task request, and the attribute identifier is used to indicate an attribute of the first task request. Further, the at least one FIFO queue in the at least two channel groups 1022 is further respectively corresponding to different preset attribute identifiers; the decoding circuit 1021 is specifically configured to: query a preset second address table according to the VMID and the attribute identifier to determine an FIFO queue that matches the VMID and the attribute identifier, and configure the first task request to be in the FIFO queue that matches the VMID and the attribute identifier, where the second address table includes a correspondence between each FIFO queue in the at least two channel groups, a preset VMID, and a preset attribute identifier, and respective priorities are preset for FIFO queues in each channel group. The following exemplarily describes the second address table with reference to Table2, and for some identifiers and symbols, reference may be made to Table 1.

|       | VMID | PID | Request   |
|-------|------|-----|-----------|
| FIFO1 | 1    | 2   | read      |
| FIFO2 | 1    | 2   | write     |
| FIFO3 | 1    | 1   | interrupt |
| FIFO4 | 1    | 3   | Mod       |

For ease of description, Table 2 uses only one channel group (VMID=1) as an example, and a correspondence between each FIFO queue in another channel group, a preset VMID, and a preset attribute identifier is similar thereto. In Table 2, it is assumed that the channel group includes four FIFO memories, and the four FIFO memories are respectively corresponding to preset priorities and preset attribute identifiers (represented by Request herein). The attribute identifiers in the table include: read (read), write (write), interrupt (interrupt), and modulo operation (Mod), which represent different types of task requests, where priorities of the read and write task requests are the same. If the first task request carries VMID=1 and the attribute identifier is write, the first task request may be configured to be in FIFO 2 according to Table 1. Other cases are similar thereto, and details are not described. It should be noted that the foregoing is merely an example of the second address table in this embodiment, and in an actual application, the second address table may be set according to a task request processed by a hardware accelerator. Likewise, the VMID and/or attribute identifier in this implementation manner may also be configured by a dedicated processor in the baseband chip.

In an implementation manner of this embodiment, as shown in FIG. 4, the scheduling controller 103 may specifically include: a control unit 1031, a scheduling unit 1032, and a selecting unit 1033.

The selecting unit 1033 is configured to perform polling on the at least two channel groups 1022 to determine, from the at least two channel groups 1022, a target channel group that has a to-be-processed second task request in the $n^{th}$ period, and feed back the determined target channel group to the control unit 1031. The target channel group may be some or all channel groups of the at least two channel groups 1022. It should be noted that the selecting unit 1033 actually determines whether an FIFO queue that is in a full state in the $n^{th}$ period exists in the channel groups. For example, if at least one FIFO queue that is in the full state in the $n^{th}$ period exists in a channel group A, the channel group A is determined as a target channel group. On the contrary, if none of FIFO queues in a channel group B is in the full state, the channel group B is not a target channel group. A FIFO queue in the full state indicates that a task request that needs to be scheduled exists in the FIFO queue, which is common knowledge in the art, and further description is not made herein. In addition, for saving of time, the selecting unit 1033 generally may concurrently perform polling on the at least two channel groups 1022, that is, the selecting unit 1033 may perform polling on all FIFO queues in the at least two channel groups 1022. The channel groups shown in Table 1 are used as an example. The selecting unit 1033 may perform polling on FIFO 1, FIFO 2, FIFO 3, FIFO 4, FIFO 5, and FIFO 6 as a whole, or may separately perform polling on at least one FIFO queue in each channel group. The channel groups shown in Table 1 are still used as an example. The selecting unit 1033 may concurrently perform polling on FIFO 1, FIFO 2, and FIFO 3 in the channel group 1, and FIFO 4, FIFO 5, and FIFO 6 in the channel group 2, that is, polling is concurrently performed on the channel group 1 and the channel group 2. A person skilled in the art should know that polling mentioned in the embodiments of the present invention is performed according to a preset polling sequence, which is not described again subsequently.

The control unit 1031 is configured to: receive, according to the target channel group fed back by the selecting unit 1033, a time parameter $delay_i$ that is fed back by the accelerator core 200 and corresponding to the target channel group 1022, where the time parameter $delay_i$ includes processing time of a task request that is in each channel group and is processed by the accelerator core 200; and calculate respective weight values of the target channel groups based on formula (1):

$$W_i = Duration_i = Duration_{i'} + delay_i / Rate_i \quad (1)$$

where $W_i$ is a weight value of any channel group i of the target channel groups, $Duration_i$ is accumulated processing time of task requests in the channel group i in the $n^{th}$ period, $Duration_{i'}$ is accumulated processing time of the task requests in the channel group i in an $(n-1)^{th}$ period, $delay_i$ is processing time, in the accelerator core 200, of each task request in the channel group i in the $(n-1)^{th}$ period, $Rate_i$ is a ratio of a processing capability allocated to the channel group i to a processing capability allocated in advance by the accelerator core 200 to the at least two channel groups 1022, and i is a positive integer. It should be noted that the accelerator core 200 may allocate the processing capability to the at least two channel groups 1022 in advance. For example, when there are three channel groups, the accelerator core may divide the processing capability into ten parts, then allocate the processing capability to the three channel groups in a 3:3:4 manner. In an actual application, a ratio between the at least two channel groups 1022 may be determined according to a processing capability required by a communications standard corresponding to each channel group. In addition, the control unit 1031 may store, by using a register and the like, $Rate_i$ and $Duration_i$ that is obtained by means of calculation in each period, so as to calculate a new weight value in an $(n+1)^{th}$ period by using $Rate_i$ and $Duration_i$.

The scheduling unit 1032 is configured to read the at least one second task request to be processed in the target channel group in the $n^{th}$ period, perform, based on the respective weight values of the target channel groups, weighted round robin scheduling on the at least one second task request, and send the at least one scheduled second task request to the accelerator core 200.

Specifically, when performing the weighted round robin scheduling on the at least one second task request, the scheduling unit 1032 performs the scheduling in ascending order of the respective weight values of the target channel groups, that is, the scheduling unit 1032 preferentially schedule a second task request in a target channel group that has shorter current accumulated processing time of task requests. By using such a weighted round robin scheduling manner, values of accumulated processing time of all channel groups of the at least two channels gradually tend to be equal, so that a processing capability of the accelerator core 200 is allocated on demand and in a time dimension according to the processing capabilities required by the communications standards (that is, the processing capabilities allocated to the at least two channel groups 1022 in advance). Therefore, the hardware accelerator provided in this embodiment of the present invention can automatically control time during which each communications standard occupies an accelerator core in a multimode concurrent scenario without intervention of processor cores of different communications standards.

To better describe the scheduling manner of the scheduling unit 1032, that the queue manager 102 includes three channel groups is still used as an example herein; in addition, it is assumed that each channel group has only one to-be-processed second task request in the $n^{th}$ period.

The control unit 1031 separately determines weight values of the three channel groups according to formula (2):

$$\begin{cases} W0 = Duration\ 0 = Duration\ 0' + delay\ 0 / Rate\ 0 \\ W1 = Duration\ 1 = Duration\ 1' + delay\ 1 / Rate\ 1 \\ W2 = Duration\ 2 = Duration\ 2' + delay\ 2 / Rate\ 2 \end{cases} \quad (2)$$

where 0, 1, and 2 are sequence numbers of the channel groups, W0 is the weight value of the channel group 1, W1 is the weight value of the channel group 2, and W1 is the weight value of the channel group 3.

Accordingly, after reading, by means of polling, a task request 0 in the channel group 1, a task request 1 in the channel group 2, and a task request 2 in the channel group 3, the scheduling unit 1032 successively schedules the task request 0, the task request 1 and the task request 2 in ascending order of the weight values W0, W0, and W0. For example, when W0<W1<W2, the scheduling unit 1032 first schedules the task request 0 to the accelerator core 200, then schedules the task request 1, and finally schedules the task request 2. It should be noted that, when channel groups of a same weight value exist, for example, W0=W1<W2, the task request 0 and the task request 1 are first scheduled in a manner of polling, and then the task request 2 is scheduled after scheduling on the task request 0 and the task request 1 is completed.

Further, when multiple second task requests exist in one channel group, scheduling is performed in a priority-based manner and/or a round robin scheduling manner. For example, when W0<W1<W2 and a task request 01 and a task request 02 exist in the channel group 1, if a priority of the task request 01 is different from a priority of the task request 02, scheduling is performed in descending order of the priorities; if the priority of the task request 01 is the same as the priority of the task request 02, scheduling is performed in a polling manner. A person skilled in the art should know that when there are three or more task requests, scheduling needs to be performed by combining the foregoing two manners.

Further, as shown in FIG. 4, the scheduling unit 1032 may include: a multiplexer switch 10321 and a scheduling circuit 10322. The multiplexer switch 10321 is configured to use the weight values as control signals, sequentially select, in ascending order of the weight values, second task requests in the target channel groups, and then send the second task requests to the scheduling circuit 10322. The scheduling circuit 10322 is configured to separately schedule the second task request in each target channel group in a priority-based (denoted as "PR" in FIG. 4) and/or round robin (denoted as "RR" in FIG. 4) manner. It should be noted that the weight values of the target channel groups are specific values and may not be directly used as control signals. Therefore, to use the weighted values of the target channel groups as control signals, the weight values of the target channel groups need to be converted into corresponding control signals according to control logic of the multiplexer switch 10321. Exemplarily, three target channel groups are used as an example. When a relationship between respective weight values of the three target channel groups is W0<W1<W2, and control signals of the multiplexer switch 10321 are 0, 1, and 2, where a target channel group 1 is selected when the control signal is 0, a target channel group 2 is selected when the control signal is 1, and a target channel group 3 is selected when the control signal is 2, according to the relationship of the respective weight values of the three target channel groups, W0 may be converted into the control signal 0, W1 may be converted into the control signal 1, and W2 may be converted into the control signal 2. Such a conversion manner pertains to a common means in the art; therefore, details are not described herein.

Figure 6:
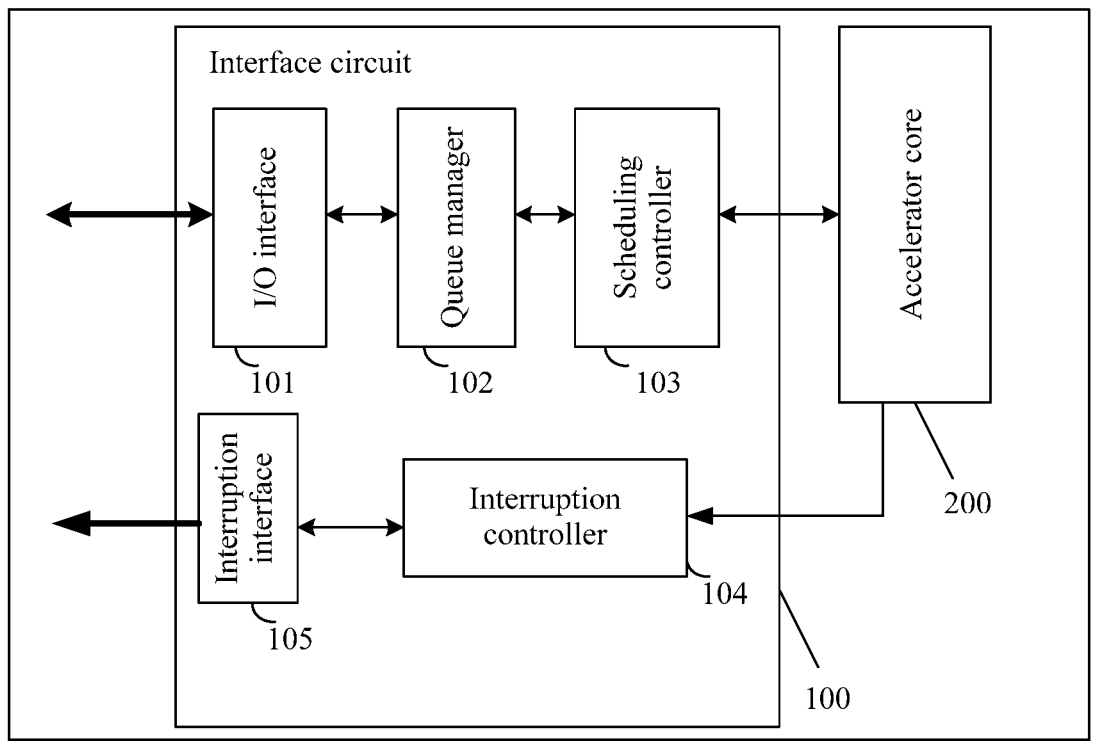
FIG. 6 is an architecture diagram of another hardware accelerator according to Embodiment 1 of the present invention.

Further, as shown in FIG. 6, the interface circuit 100 further include an interruption controller 104 and an interruption interface 105, where the interruption controller 104 includes at least two interruption units, and the at least two interruption units are corresponding, in a one-to-one manner, to the at least two communications standards. Because the at least two channel groups 1022 are also respectively corresponding, in a one-to-one manner, to the at least two communications standards, it may be considered that a quantity of the interruption units is equal to a quantity of the at least two channel groups 1022. In addition, one VMID is preset for each interruption unit, and the VMID is the same as a preset VMID of a channel group corresponding to the interruption unit. Any interruption unit of the at least two interruption units is configured to: receive interruption information sent by the accelerator core 200, acquire, by querying a preset interruption information table according to the interruption information, a VMID corresponding to the interruption information, and determine whether the VMID indicated by the interruption information is equal to the VMID corresponding to the interruption unit; and if the VMID indicated by the interruption information is equal to the VMID corresponding to the interruption unit, send the interruption information by using the interruption interface 105; or if the VMID indicated by the interruption information is not equal to the VMID corresponding to the interruption unit, prohibit sending the interruption information. The interruption information table includes a correspondence between interruption information and a VMID, and the interruption information is used to instruct a processor core of a communications standard corresponding to the any interruption unit to interrupt communication with the accelerator core, which is equivalent to that the processor core corresponding to the any interruption unit is informed that a task request from the processor core has been processed by the accelerator core 200, the accelerator core 200 has output an operation result, and the processor core does not need to perform acceleration by using the current hardware accelerator. For detailed description of a function of the interruption information, reference may be made to the prior art. Exemplarily, when sending the interruption information, the accelerator core 200 may send indication information such as a sequence number or a code of the interruption information. In this case, the interruption information table includes a correspondence between a sequence number (or a code) of the interruption information and a communications standard (that is, a VMID). Each interruption unit may learn, by querying the interruption information table, a communications standard to which currently received interruption information belongs. Meanwhile, the interruption unit further determines a VMID corresponding to the interruption unit, that is, a communications standard supported by the interruption unit. If the VMID corresponding to the interruption information is different from the VMID corresponding to the interruption unit, the interruption information is not sent.

It should be noted that the interruption units in this embodiment can be considered as interruption resources allocated by the interruption controller 104 to various communications standards. Sending of the interruption information is controlled in this manner, which can implement isolation of the interruption resources among different communications standards, and prevent the hardware accelerator from mistakenly sending a task of one communications standard to a processor core corresponding to another communications standard.

Figure 7:
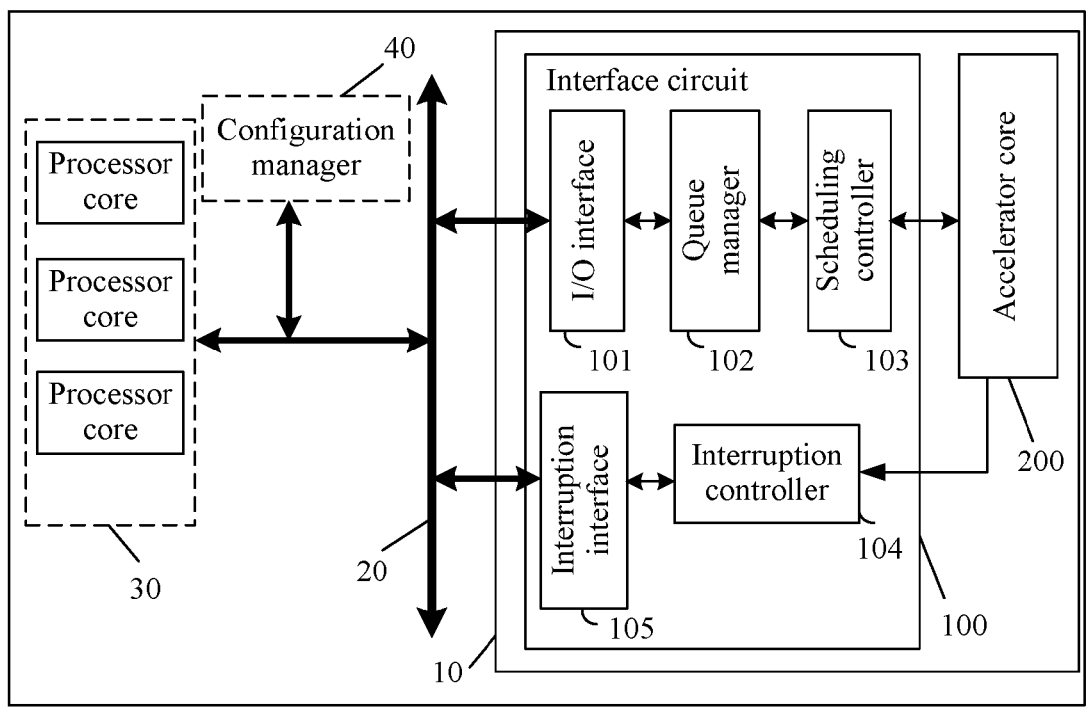
FIG. 7 is an architecture diagram of a chip according to Embodiment 2 of the present invention.

With reference to FIG. 3 to FIG. 6, and as shown in FIG. 7, Embodiment 2 of the present invention further provides a chip, including: at least two processor cores 30, a bus 20, and the hardware accelerator 10 according to Embodiment 1, where the hardware accelerator 10 communicates with the at least two processor cores 30 by using the bus 20, and the at least two processor cores 30 are separately configured to process first task requests of different communications standards.

Any processor core 30 of the at least two processor cores 30 is configured to send the first task request to the hardware accelerator 10, so that the hardware accelerator 10 responds to the first task request.

In this embodiment, the chip is generally a baseband chip or a system on chip (SOC) chip. The hardware accelerator 10 bears partial algorithm functions of the at least two processor cores 30, and schedules, by using the solutions in Embodiment 1, first task requests sent by the processor cores, which can effectively isolate a processing capability that is of the hardware accelerator 10 and occupied by each processor core, and avoid mutual impact. In addition, an isolation process is implemented by the hardware accelerator without intervention of the processor core.

Further, the chip further includes: a configuration manager 40, where the configuration manager 40 is configured to configure identifier information for the first task requests from the at least two processor cores 30, so that the hardware accelerator 10 schedules the first task requests according to the identifier information.

Different identifier information is configured, so that the hardware accelerator 10 may separately perform configuration on first task requests from different processor cores, which implements isolation of a configuration process without intervention of the processor cores.

It should be understood that the specific embodiments described above are merely common embodiments of the present invention, but are not intended to limit the present invention. Any modification, equivalent replacement, or improvement made without departing from the spirit and principle of the present invention shall fall within the protection scope of the present invention.

What is claimed is:

1. A hardware accelerator, comprising: an interface circuit and an accelerator core coupled to the interface circuit, wherein the interface circuit comprises: an input/output (I/O) interface, a queue manager, and a scheduling controller; wherein the I/O interface is configured to receive a first task request, wherein the first task request carries identifier information used to indicate a communications standard to which the first task request belongs, and a priority of the first task request;

the queue manager comprises: a decoding circuit and at least two channel groups, wherein the at least two channel groups are respectively corresponding to at least two preset communications standards, each channel group is corresponding to one communications standard, any one of the channel groups comprises at least one first in first out (FIFO) queue, and the at least one FIFO queue is respectively corresponding to at least one preset priority; and the decoding circuit is configured to perform decoding on the first task request to acquire the identifier information, and configure, according to the identifier information, the first task request to be in a FIFO queue that matches the identifier information;

the scheduling controller is configured to determine, from the at least two channel groups, one or more target channel groups that have at least one to-be-processed second task request in an $n^{th}$ period, receive a time parameter that is fed back by the accelerator core and corresponding to the target channel group, and schedule the at least one second task request in the one or more target channel groups according to the time parameter and a weighted round robin algorithm, wherein the $n^{th}$ period is any period in which the scheduling controller performs periodic scheduling on a task request in the at least two channel groups, and n is a natural number; and the accelerator core is configured to respond to the at least one scheduled second task request.

2. The hardware accelerator according to claim 1, wherein when the identifier information comprises a first virtual machine identifier (VMID) and a priority identifier (PID), wherein the first VMID indicates the communications standard to which the first task request belongs and the PID indicates the priority of the first task request, the decoding circuit is specifically configured to: query a preset first address table according to the first VMID and the PID to determine a FIFO queue that matches the first VMID and the PID, and configure the first task request to be in the matched FIFO queue, wherein the first address table comprises a correspondence between each FIFO queue in the at least two channel groups, a preset VMID, and a preset PID.

3. The hardware accelerator according to claim 1, wherein when the identifier information comprises a virtual machine identifier (VMID) and an attribute identifier and the at least one FIFO queue is further respectively corresponding to a preset attribute identifier, wherein the VMID indicates the communications standard to which the first task request belongs and the attribute identifier indicates an attribute of the first task request, the decoding circuit is specifically configured to: query a preset second address table according to the VMID and the attribute identifier to determine a FIFO queue that matches the VMID and the attribute identifier, and configure the first task request to be in the FIFO queue that matches the VMID and the attribute identifier, wherein the second address table comprises a correspondence between each FIFO queue in the at least two channel groups, a preset VMID, and a preset attribute identifier.

4. The hardware accelerator according to claim 1, wherein the scheduling controller comprises: a control unit, a scheduling unit, and a selecting unit, wherein the selecting unit is configured to perform polling on the at least two channel groups to determine the one or more target channel groups from the at least two channel groups;

the control unit is configured to receive the time parameter $delay_i$ that is fed back by the accelerator core and corresponding to the target channel group, and calculate respective weight values of the target channel groups according to the following formula:

$W_i = Duration_i = Duration_{i'} + delay_i / Rate_i$, wherein $W_i$ is a weight value of any channel group i of the target channel groups, $Duration_i$ is accumulated processing time of task requests in the channel group i in the $n^{th}$ period, $Duration_{i'}$ is accumulated processing time of the task requests in the channel group i in an $(n-1)^{th}$ period, $delay_i$ is processing time, in the accelerator core, of each task request in the channel group i in the $(n-1)^{th}$ period, $Rate_i$ is a ratio of a processing capability allocated to the channel group i to a processing capability allocated in advance by the accelerator core to the at least two channel groups, and i is a positive integer; and the scheduling unit is configured to read the at least one second task request to be processed in the one or more target channel groups in the $n^{th}$ period, perform, based on the respective weight values of the target channel groups, weighted round robin scheduling on the at least one second task request, and send the at least one scheduled second task request to the accelerator core.

5. The hardware accelerator according to claim 4, wherein the selecting unit is specifically configured to perform polling on all FIFO queues in the at least two channel groups, or configured to concurrently perform polling on each channel group of the at least two channel groups to determine the one or more target channel groups from the at least two channel groups.

6. The hardware accelerator according to claim 4, wherein when performing the weighted round robin scheduling on the at least one second task request, the scheduling unit performs the scheduling in ascending order of the respective weight values of the target channel groups.

7. The hardware accelerator according to claim 4, wherein the scheduling unit specifically comprises: a multiplexer switch and a scheduling circuit, wherein the multiplexer switch is configured to separately convert the respective weight values of the target channel groups into control signals, sequentially select, in ascending order of the respective weight values of the target channel groups, a second task request in each target channel group and then send the second task request to the scheduling circuit; and the scheduling circuit is configured to separately schedule the second task request in each target channel group to the accelerator core in a priority-based and/or round robin scheduling manner.

8. The hardware accelerator according to claim 2, wherein the accelerator core is further configured to count a time parameter of each task request in the $n^{th}$ period and provide a feedback to the scheduling controller in an $(n+1)^{th}$ period, so that the scheduling controller performs next scheduling.

9. The hardware accelerator according to claim 2, wherein the interface circuit further comprises an interruption controller and an interruption interface, wherein the interruption controller comprises at least two interruption units, the at least two interruption units are corresponding, in a one-to-one manner, to the at least two communications standards, and any interruption unit of the at least two interruption units is configured to: receive interruption information sent by the accelerator core, and acquire, by querying a preset interruption information table, a VMID corresponding to the interruption information; and if the VMID corresponding to the interruption information is equal to a preset VMID of a channel group corresponding to the any interruption unit, send the interruption information by using the interruption interface; or if the VMID corresponding to the interruption information is not equal to a preset VMID of a channel group corresponding to the any interruption unit, prohibit sending the interruption information; wherein the interruption information table comprises a correspondence between interruption information and a VMID, and the interruption information is used to instruct a processor core of a communications standard corresponding to the any interruption unit to interrupt communication with the accelerator core.

10. A chip, comprising: at least two processor cores, a bus, and a hardware accelerator, wherein the hardware accelerator communicates with the at least two processor cores by using the bus, and the at least two processor cores are respectively corresponding, in a one-to-one manner, to at least two communications standards and configured to generate first task requests of different communications standards; and any processor core of the at least two processor cores is configured to send the first task request to the hardware accelerator, so that the hardware accelerator responds to the first task request;

wherein the hardware accelerator, comprising: an interface circuit and an accelerator core coupled to the interface circuit, wherein the interface circuit comprises: an input/output (I/O) interface, a queue manager, and a scheduling controller; wherein the I/O interface is configured to receive a first task request, wherein the first task request carries identifier information used to indicate a communications standard to which the first task request belongs, and a priority of the first task request;

the queue manager comprises: a decoding circuit and at least two channel groups, wherein the at least two channel groups are respectively corresponding to at least two preset communications standards, each channel group is corresponding to one communications standard, any one of the channel groups comprises at least one first in first out (FIFO) queue, and the at least one FIFO queue is respectively corresponding to at least one preset priority; and the decoding circuit is configured to perform decoding on the first task request to acquire the identifier information, and configure, according to the identifier information, the first task request to be in a FIFO queue that matches the identifier information;

the scheduling controller is configured to determine, from the at least two channel groups, one or more target channel groups that have at least one to-be-processed second task request in an $n^{th}$ period, receive a time parameter that is fed back by the accelerator core and corresponding to the target channel group, and schedule the at least one second task request in the one or more target channel groups according to the time parameter and a weighted round robin algorithm, wherein the $n^{th}$ period is any period in which the scheduling controller performs periodic scheduling on a task request in the at least two channel groups, and n is a natural number; and the accelerator core is configured to respond to the at least one scheduled second task request.

11. The chip according to claim 10, wherein the chip further comprises: a configuration manager, wherein the configuration manager is adapted to configure identifier information for the first task requests from the at least two processor cores, so that the hardware accelerator schedules the first task requests according to the identifier information.

12. The chip according to claim 10, wherein when the identifier information comprises a first virtual machine identifier (VMID) and a priority identifier (PID), wherein the first VMID indicates the communications standard to which the first task request belongs and the PID indicates the priority of the first task request, the decoding circuit is specifically configured to: query a preset first address table according to the first VMID and the PID to determine a FIFO queue that matches the first VIVID and the PID, and configure the first task request to be in the matched FIFO queue, wherein the first address table comprises a correspondence between each FIFO queue in the at least two channel groups, a preset VMID, and a preset PID.

13. The chip according to claim 10, wherein when the identifier information comprises a virtual machine identifier (VMID) and an attribute identifier and the at least one FIFO queue is further respectively corresponding to a preset attribute identifier, wherein the VMID indicates the communications standard to which the first task request belongs and the attribute identifier indicates an attribute of the first task request, the decoding circuit is specifically configured to: query a preset second address table according to the VMID and the attribute identifier to determine a FIFO queue that matches the VMID and the attribute identifier, and configure the first task request to be in the FIFO queue that matches the VMID and the attribute identifier, wherein the second address table comprises a correspondence between each FIFO queue in the at least two channel groups, a preset VMID, and a preset attribute identifier.

14. The chip according to claim 10, wherein the scheduling controller comprises: a control unit, a scheduling unit, and a selecting unit, wherein the selecting unit is configured to perform polling on the at least two channel groups to determine the one or more target channel groups from the at least two channel groups;

the control unit is configured to receive the time parameter $delay_i$ that is fed back by the accelerator core and corresponding to the target channel group, and calculate respective weight values of the target channel groups according to the following formula:

$$W_i = Duration_{i'} = Duration_i + delay_i / Rate_i, \text{ wherein}$$

$W_i$ is a weight value of any channel group i of the target channel groups, $Duration_i$ is accumulated processing time of task requests in the channel group i in the $n^{th}$ period, $Duration_{i'}$ is accumulated processing time of the task requests in the channel group i in an $(n-1)^{th}$ period, $delay_i$ is processing time, in the accelerator core, of each task request in the channel group i in the $(n-1)^{th}$ period, $Rate_i$ is a ratio of a processing capability allocated to the channel group i to a processing capability allocated in advance by the accelerator core to the at least two channel groups, and i is a positive integer; and the scheduling unit is configured to read the at least one second task request to be processed in the one or more target channel groups in the $n^{th}$ period, perform, based on the respective weight values of the target channel groups, weighted round robin scheduling on the at least one second task request, and send the at least one scheduled second task request to the accelerator core.

15. The chip according to claim 14, wherein the selecting unit is specifically configured to perform polling on all FIFO queues in the at least two channel groups, or configured to concurrently perform polling on each channel group of the at least two channel groups to determine the one or more target channel groups from the at least two channel groups.

16. The chip according to claim 14, wherein when performing the weighted round robin scheduling on the at least one second task request, the scheduling unit performs the scheduling in ascending order of the respective weight values of the target channel groups.

17. The chip according to claim 14, wherein the scheduling unit specifically comprises: a multiplexer switch and a scheduling circuit, wherein the multiplexer switch is configured to separately convert the respective weight values of the target channel groups into control signals, sequentially select, in ascending order of the respective weight values of the target channel groups, a second task request in each target channel group and then send the second task request to the scheduling circuit; and the scheduling circuit is configured to separately schedule the second task request in each target channel group to the accelerator core in a priority-based and/or round robin scheduling manner.

18. The chip according to claim 12, wherein the accelerator core is further configured to count a time parameter of each task request in the $n^{th}$ period and provide a feedback to the scheduling controller in an $(n+1)^{th}$ period, so that the scheduling controller performs next scheduling.

19. The chip according to claim 12, wherein the interface circuit further comprises an interruption controller and an interruption interface, wherein the interruption controller comprises at least two interruption units, the at least two interruption units are corresponding, in a one-to-one manner, to the at least two communications standards, and any interruption unit of the at least two interruption units is configured to: receive interruption information sent by the accelerator core, and acquire, by querying a preset interruption information table, a VMID corresponding to the interruption information; and if the VMID corresponding to the interruption information is equal to a preset VMID of a channel group corresponding to the any interruption unit, send the interruption information by using the interruption interface; or if the VMID corresponding to the interruption information is not equal to a preset VMID of a channel group corresponding to the any interruption unit, prohibit sending the interruption information; wherein the interruption information table comprises a correspondence between interruption information and a VMID, and the interruption information is used to instruct a processor core of a communications standard corresponding to the any interruption unit to interrupt communication with the accelerator core.

* * * * *

UNITED STATES PATENT AND TRADEMARK OFFICE
CERTIFICATE OF CORRECTION

| | |
|---|---|
| PATENT NO. | : 9,842,069 B2 |
| APPLICATION NO. | : 14/981523 |
| DATED | : December 12, 2017 |
| INVENTOR(S) | : Yupeng Wan |

Page 1 of 1

It is certified that error appears in the above-identified patent and that said Letters Patent is hereby corrected as shown below:

In the Claims

Column 18, Line 25, "the first VIVID" should read -- the first VMID --.

Signed and Sealed this
First Day of May, 2018

Andrei Iancu
*Director of the United States Patent and Trademark Office*